United States Patent
Packard et al.

(10) Patent No.: US 10,056,116 B2
(45) Date of Patent: Aug. 21, 2018

(54) DATA PROCESSING SYSTEM FOR AUTOMATICALLY GENERATING EXCITEMENT LEVELS WITH IMPROVED RESPONSE TIMES USING PROSPECTIVE DATA

(71) Applicant: THUUZ, INC., Palo Alto, CA (US)

(72) Inventors: Warren Joseph Packard, Palo Alto, CA (US); Alan Levin, Vancouver (CA)

(73) Assignee: THUUZ, INC., Palo Alto, CA (US)

( * ) Notice: Subject to any disclaimer, the term of this patent is extended or adjusted under 35 U.S.C. 154(b) by 34 days.

(21) Appl. No.: 15/345,854

(22) Filed: Nov. 8, 2016

(65) Prior Publication Data

US 2018/0108380 A1    Apr. 19, 2018

Related U.S. Application Data

(60) Provisional application No. 62/409,780, filed on Oct. 18, 2016.

(51) Int. Cl.
| | |
|---|---|
| *H04N 5/77* | (2006.01) |
| *G11B 27/34* | (2006.01) |
| *H04N 21/266* | (2011.01) |
| *H04N 21/8549* | (2011.01) |
| *H04N 21/2187* | (2011.01) |
| *H04N 21/234* | (2011.01) |
| *G06K 9/00* | (2006.01) |
| *H04N 21/2668* | (2011.01) |
| *G11B 27/031* | (2006.01) |

(52) U.S. Cl.
CPC .......... *G11B 27/34* (2013.01); *G06K 9/00724* (2013.01); *G11B 27/031* (2013.01); *H04N 21/2187* (2013.01); *H04N 21/23418* (2013.01); *H04N 21/2668* (2013.01); *H04N 21/26603* (2013.01); *H04N 21/8549* (2013.01); *G06K 2009/00738* (2013.01)

(58) Field of Classification Search
CPC ........................ G11B 27/34; G06K 9/00724
See application file for complete search history.

(56) References Cited

U.S. PATENT DOCUMENTS

2014/0067939 A1 *   3/2014  Packard ............... H04N 21/252
                                                                  709/204

* cited by examiner

*Primary Examiner* — Hung Dang
*Assistant Examiner* — Girumsew Wendmagegn
(74) *Attorney, Agent, or Firm* — Vierra Magen Marcus LLP

(57) ABSTRACT

A data processing system automatically generates excitement levels with improved response times using prospective data. One embodiment includes accessing data that provides state information for an event at different times during the event, automatically generating a plurality of excitement levels based on the accessed data, and reporting the generated excitement levels. Each of the excitement levels of the plurality of excitement levels corresponds to a different sample time during the event. For each sample time, the generating of the plurality of excitement levels comprises calculating an excitement level based on accessed data prior in time to the sample time and accessed data subsequent in time to the sample time.

26 Claims, 10 Drawing Sheets

Figure 8
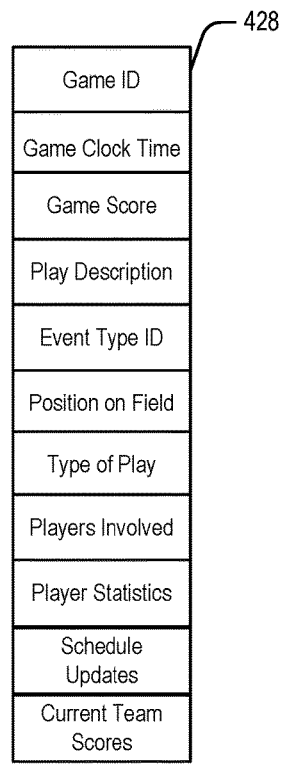
Figure 9
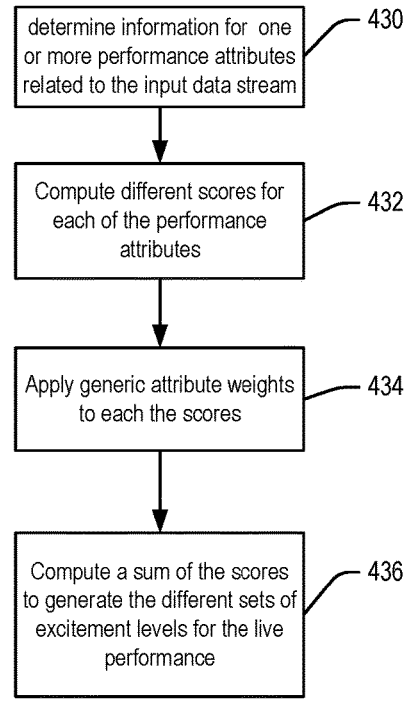
Figure 10A
$$EL(i) = Pace[0 \rightarrow i] + Parity[0 \rightarrow i] + Novelty[i] + Momentum[0 \rightarrow i] + Context[0] + Social\_Buzz[i]$$
Figure 10B
$$EL(i) = Pace[0 \rightarrow i, i \rightarrow N] + Parity[0 \rightarrow i, i \rightarrow N] + Novelty[i] + Momentum[0 \rightarrow i, i \rightarrow N] + Context[0] + Social\_Buzz[i]$$

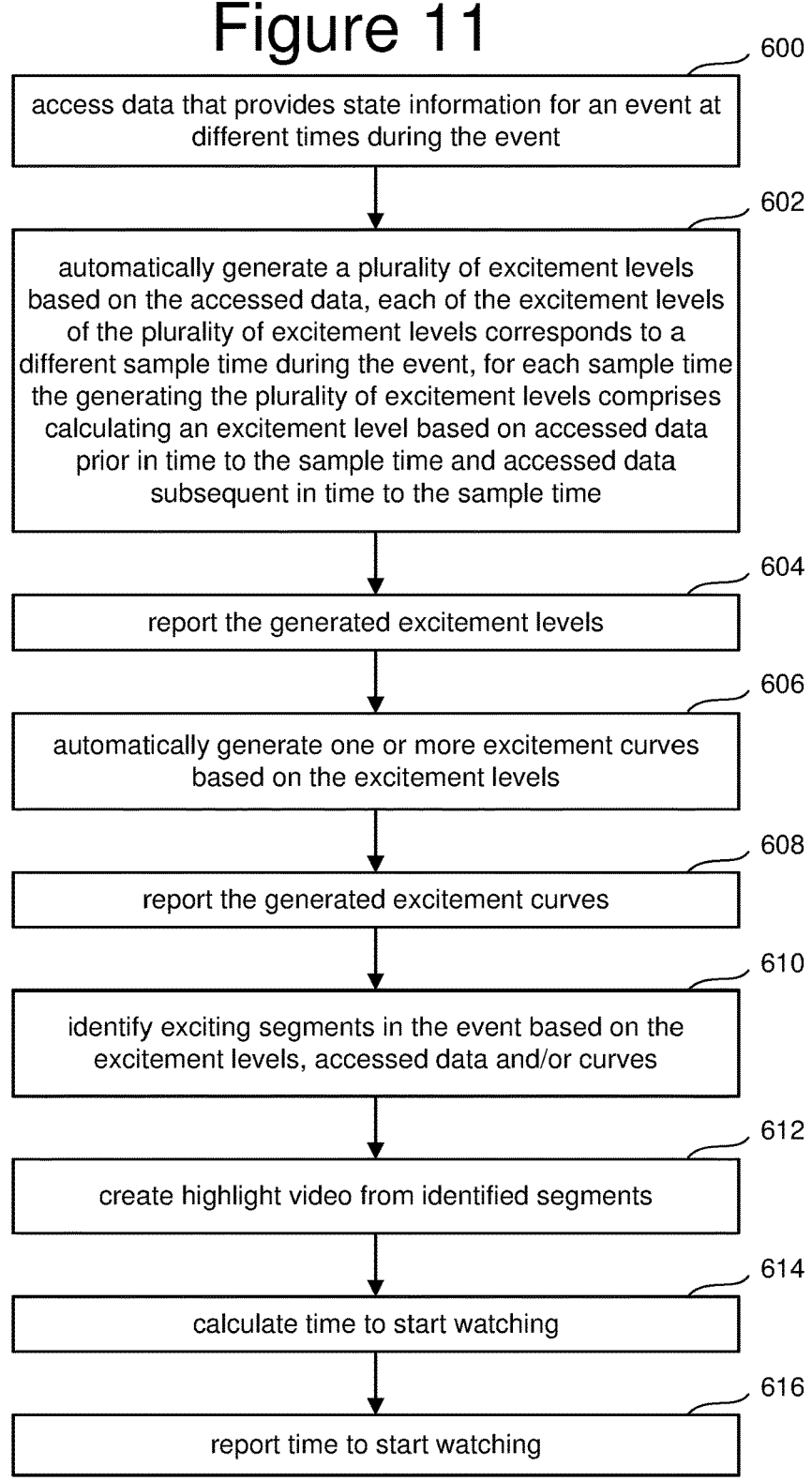

US 10,056,116 B2

DATA PROCESSING SYSTEM FOR AUTOMATICALLY GENERATING EXCITEMENT LEVELS WITH IMPROVED RESPONSE TIMES USING PROSPECTIVE DATA

This Application claims priority to U.S. Provisional Application 62/409,780, filed Oct. 18, 2016, titled "Data Processing System For Automatically Generating Excitement Levels With Improved Response Times Using Prospective Data," incorporated herein by reference in its entirety.

BACKGROUND

There are many different kinds of audio, visual and audio-visual presentations that people are exposed to including sporting events, dramas, reality shows, competitions, etc. Often, a small group of people manually evaluate the presentations for others. However, evaluation of a presentation or event by an individual is not a good indicator of how a majority of people will react or appreciate the event.

Automatically predicting human response to viewing an event provides a more generic prediction of the merit of the event/presentation that can be applicable to a larger and more diverse population. However, automatically predicting human response using computers is a difficult task to perform accurately.

BRIEF DESCRIPTION OF THE DRAWINGS

The components in the drawings are not necessarily to scale relative to each other. Like reference numerals designate corresponding parts throughout the several views.

FIG. 8 is an example data structure.

FIG. 9 is a flow chart describing one embodiment of a process for generating excitement levels.

FIG. 10A is an equation used to generate an excitement level.

FIG. 10B is an equation used to generate an excitement level.

FIG. 11 is a flow chart describing one embodiment of a process for automatically generating excitement levels with improved response times using prospective data.

DETAILED DESCRIPTION

Figure 1:
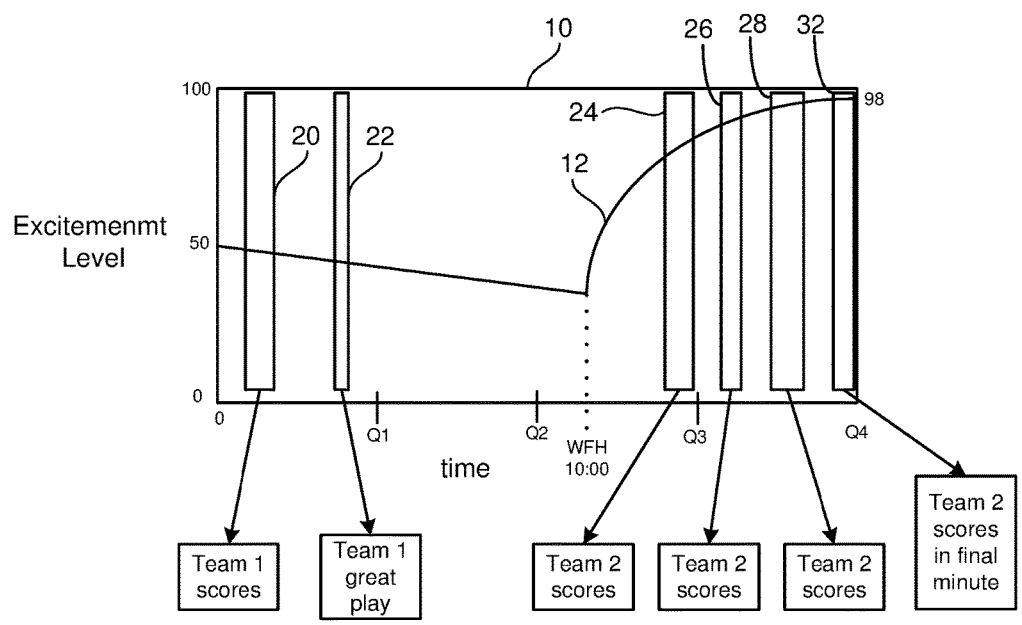
FIG. 1 depicts graphical user interface.

We live in a data driven society. Sensors and humans are used to generate large amounts of data characterizing all kinds of events from personal work outs to professional sporting events, as well as atmospheric conditions to machine performance and pharmaceutical research to human population trends. This seemingly infinite amount of information is stored in large data structures, and referred to as Big Data.

Computers are used to analyze Big Data and extract trends and conclusions. Often, analysis of Big Data results in a series of data points each representing a metric at a different time (or location). Connecting the data points to form a curve can be used to infer trends. At any position along such a curve, the magnitude of the curve can be used to characterize an instantaneous state of the system or event being measured. However, the magnitude of the curve at any one position can be a poor predictor of future results, which can lead to false negatives or false positives.

One example of a data service is a data processing system that automatically generates a metric identifying how exciting an event is. One example of an event is a sporting event; however, other events can also be analyzed. Currently, there are many services that provide game highlights, box scores, and performance commentary for sporting events. However, these services generally spoil the excitement of recorded sports performances by revealing the score and statistics of what transpired. A fan seeking to watch highlights of a game that he or she missed or a fan reminded of a game that was missed is typically informed of the outcome of the performance, causing the fan to miss out on the excitement of experiencing the game as it unfolds.

Additionally, with the amount of performances available over the Internet and time-shifted to a DVR, sports fans can spend precious hours viewing a boring game or one that simply turns out as expected. This results in the inefficient use of the sports fans' time, a potential decrease in advertisement revenue, and the loss of viewership, and does not allow a fan to experience all the thrill of the game as it unfolds in front of them.

A data service is proposed that automatically generates excitement ratings for sporting events (and other types of events). A human watching an event can use emotions to determine whether an event is exciting. A computer automatically determining that an event is exciting has no access to emotions and must rely on analysis of data describing the event. As explained above, it is important that such data analysis accurately determines if a human will find the event exciting and avoid false negatives as well as false positives.

A data processing system is proposed, therefore, that automatically generates excitement levels with improved response times using prospective data. One embodiment includes accessing data that provides state information for an event at different times during the event, automatically generating a plurality of excitement levels based on the accessed data, and reporting the generated excitement levels. Each of the excitement levels of the plurality of excitement levels corresponds to a different sample time during the event. For each sample time the generating of the plurality of excitement levels comprises calculating an excitement level based on accessed data prior in time to the sample time and accessed data subsequent in time to the sample time.

The technology disclosed herein relates to generating excitement levels for events. As used herein, an event refers to any live action or content that has an element of uncertainty, suspense, surprise or competitiveness associated with it. The disclosed technology directs sports (or other types of) fans and enthusiasts to the most exciting events to watch, while preserving the emotional thrill of watching the event play out. Individuals are alerted to the most exciting events and when to start watching them. Based on this information, individuals can choose whether to watch events that have been recorded, events that are being replayed and/or highlight videos available for events that have occurred in the past.

In order to preserve the suspense of events that fans may not be able to watch live, the disclosed technology can indicate only the excitement level of a match, without revealing the score or other spoilers. Individuals or fans who elect to time shift their viewing have confidence that the event they are watching is going to be truly exciting without knowing anything else about the event, thus allowing them to experience the thrill of an event as it unfolds in front of them.

In one set of embodiments, the disclosed technology generates different excitement levels for events based on factors that might make the event more exciting or less exciting for different categories of subscribers and/or by analyzing live feeds of play-by-play statistics related to the event. In one embodiment, the different categories of subscribers relate to fans of a particular type of performance, team, league, player, division, conference, game, sport, genre or other variable. In one example, the different categories of subscribers include home team fans, visiting team fans and neutral fans. As used herein, a home team fan refers to a subscriber who is a fan of (or otherwise has an affinity for) the team that hosts the event, the visiting team fan refers to a subscriber who is a fan of (or otherwise has an affinity for) the team opposing the home team, and the neutral fan does not have a preference or affinity for the home team or the visiting team. In some embodiments, the event may involve more than two teams and/or one or more individuals. In some embodiments, the excitement levels, excitement curves, alerts and teasers can be generated separately for home team fans, visiting team fans and neutral fans. When the event involves more than two teams and/or one or more individuals, the excitement levels, curves, and alerts can be generated separately for each of the multiple teams and/or individuals.

Excitement levels, curves, and alerts can also be generated for other groups of people. For example, excitement levels, curves, and alerts can be generated separately for different subscribers based on subscriber's affinity for fast paced games, games with huge momentum swings, games with great historical context, games in which the subscriber has a wagering interest in aspects of the outcome such as total score or score difference, or other categories. Example subscriber categories may relate to the type of event that a subscriber finds exciting, such as a crash within an auto racing performance or an occurrence of a fight during a hockey game. The different sets of excitement levels, excitement curves, and alerts are reported to a plurality of subscribers based on one or more subscriber preferences. In one example, the subscriber preferences include a list of the subscriber's favorite sports, favorite teams, favorite players, types of sport (for example, low scoring games).

In one embodiment, the different sets of excitement levels are reported to the plurality of subscribers as different sets of excitement curves. The different sets of excitement curves graphically represent the different sets of excitement levels over different points in time during the event. In one example, the excitement level for an event is a rating given to the event on a scale of 0 to 100, with 0 being a boring event and 100 being an extremely exciting event. In one set of examples, three (or more) excitement curves are generated: one for the home team fan, one for the visiting team fan and one for the neutral fan. In other examples, additional excitement curves are generated, such as for a fan who does not like one of the teams, a fan who likes a team that is a rival to one of the teams or a fan who likes any close game. Subscribers can view the excitement curves to decide whether to watch a recorded event.

FIG. 1 is an example graphical user interface ("GUI") 10 that is reported/displayed on an end user's computing device or other computing device. Examples of end user computing devices includes smart cellular phones, tablets, laptops, desktop computers, wearable computing devices (including watches), etc. GUI 10 depicts a graph with excitement level on the y-axis and time on the x-axis. In the example of FIG. 1, the event is a sporting event with four quarters, such that time Q1 represents the end of the first quarter, time Q2 represents the end of the second quarter, time Q3 represents the end of the third quarter, and time Q4 represents the end of the fourth quarter. The system computes a plurality of excitement levels for the event. The final excitement level, 98, is displayed at the top right corner of the graph.

The system also generates and displays excitement curve 12 based on the computed plurality of excitement levels for the event. In one embodiment, excitement curve 12 is smoothed out to be more visually appealing, while in other embodiments excitement curve 12 is more jagged as no smoothing of the data is performed.

The system also generates and reports a time to watch the event based on the excitement levels. For example, FIG. 1 shows WFH (Watch From Here) indicator at time 10:00 of the third quarter.

The system also identifies interesting and exciting segments of the event based on the excitement levels and data of the happenings during the event and displays those segments 20, 22, 24, 26, 28 and 32 in GUI 10. Below each segment 20, 22, 24, 26, 28 and 32 is an arrow pointing to a box that summaries the action that occurred in the segment. The system generates a highlight video based on the segments; for example, a video can be generated and displayed.

Figure 2:
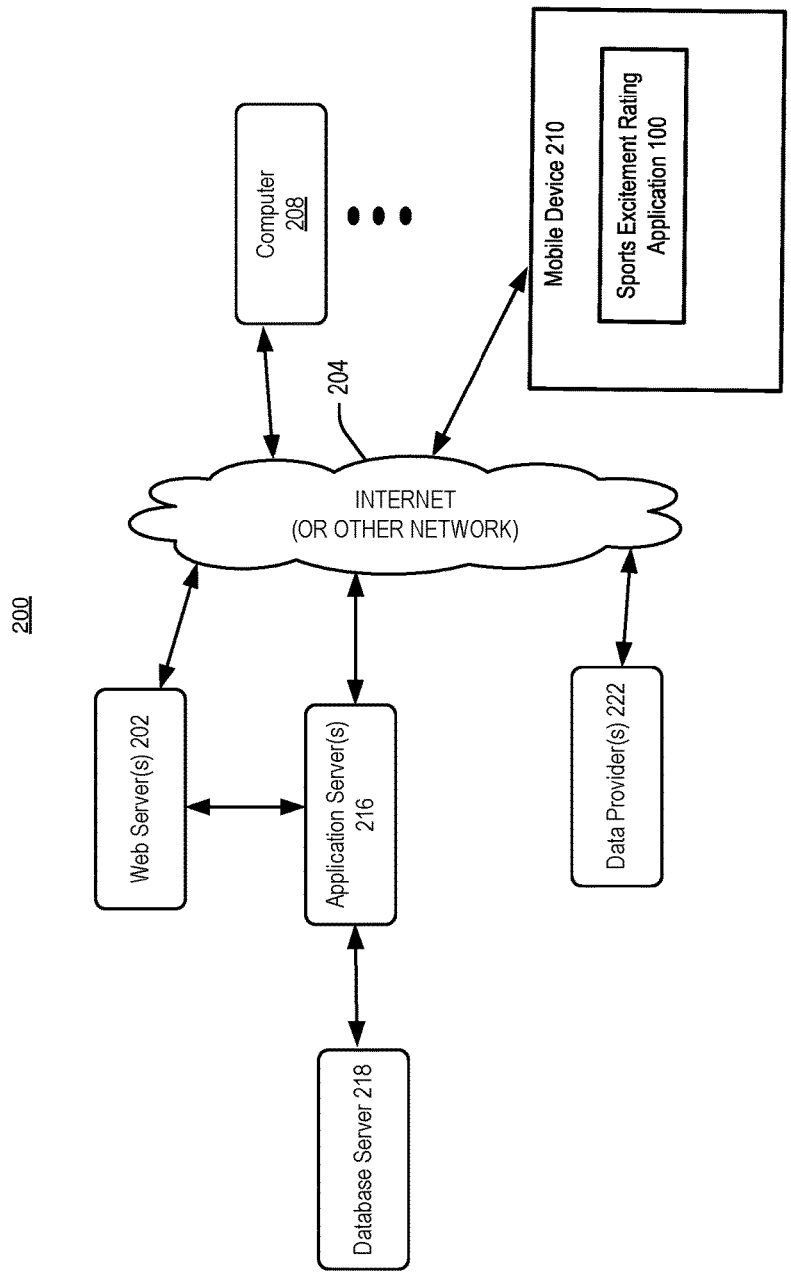
FIG. 2 is a block diagram of one embodiment of a data processing system for automatically generating excitement levels with improved response times using prospective data.

FIG. 2 is a block diagram of one embodiment of the hardware components of a system for generating excitement levels, excitement curves, and alerts for an event. System 200 includes one or more Web Server(s) 202 coupled via a network 204 to one or more Client Devices, including one or more computers 208 and one or more mobile devices 210. Network 204 may be a public network, a private network, or a combination of public and private networks such as the Internet. Network 204 can be a LAN, WAN, wired, wireless and/or combination of the above. The Client Devices 208 and 210 may include a conventional computing device, such as a desktop computer, laptop computer, cellular telephone, a smartphone, tablet computer, TV, set-top box, or any other type of computing system capable of connecting to the Network 204, either by a wire or wirelessly. The Client Devices may also include a recording device capable of receiving events such as a DVR, PVR or other media recording devices. Although FIG. 2 shows two client devices, it is anticipated that the system would be used by many client devices.

Web Server(s) 202 include one or more physical computing devices and/or software that can receive requests from Client Devices 208 and 210 and respond to those requests with data, as well as send out unsolicited alerts, teasers and other messages. Web Server(s) 202 may employ various strategies for fault tolerance and scalability such as load balancing, caching and clustering. Web Server(s) 202 maintain, or otherwise designate, one or more Application Server(s) 216 to respond to requests received from and provide services to Client Devices 208 and 210. Application Server(s) 216 provides access to the business logic for use by client application programs in Client Devices 208 and 210. Application Server(s) 216 may be co-located, co-owned, or co-managed with Web Server(s) 202. Application Server(s) 216 may also be remote from Web Server(s) 202. In one embodiment, Application Server(s) 216 interact with a Database Server 218 to perform one or more operations of the disclosed technology.

In an exemplary operation of System 200, one or more subscribers on Client Devices 208 and 210 who wish to view different excitement levels, excitement curves, and/or alerts (e.g., such as the GUI of FIG. 1) related to one or more events invoke the Sports Excitement Rating Application 100 via a user interface in the subscriber's client device. In one embodiment, a list of a subscriber's preferences comprising the subscriber's favorite sports and teams within each sport that the subscriber wishes to receive excitement ratings for is received by the Sports Excitement Rating Application 100 via a user interface on the client device.

Application Server(s) 216, which may include one or more computing devices, analyzes live feeds of play-by-play statistics related to one or more events from Data Providers 222. Examples of Data Providers 222 may include, but are not limited to, providers of real-time sports information such as STATS™, OPTA™ and Sports Direct™. In one embodiment, Application Server(s) 216 generates different sets of excitement levels and excitement curves for one or more events for different categories of subscribers based on the analysis. In other embodiments, Application Server(s) 216 also generates different sets of alerts related to the events for different categories of subscribers.

Application Server(s) 216 sends the different sets of excitement levels, excitement curves, and alerts to a plurality of subscribers on Client Devices 208 and 210 via Web server(s) 202. In one embodiment, Application Server(s) 216 may also customize the different sets of excitement levels, excitement curves, and alerts prior to sending the different sets of excitement levels, excitement curves, and alerts to the plurality of subscribers, based on the subscribers' preferences. The different sets of excitement levels, excitement curves, and alerts and teasers are displayed to the plurality of subscribers via the Sports Excitement Rating Application 220 on the subscribers' client devices. For example, Sports Excitement Rating Application 220 will implement the GUI of FIG. 1.

Database Server 218 stores the results received from Application server(s) 216. In one embodiment, the results include different sets of excitement levels, excitement curves, and alerts related to one or more events. Database server 218 also stores information such as the real-time updates related to the events received from Data Providers 222, and subscriber preferences related to a plurality of subscribers in the system.

Figure 3:
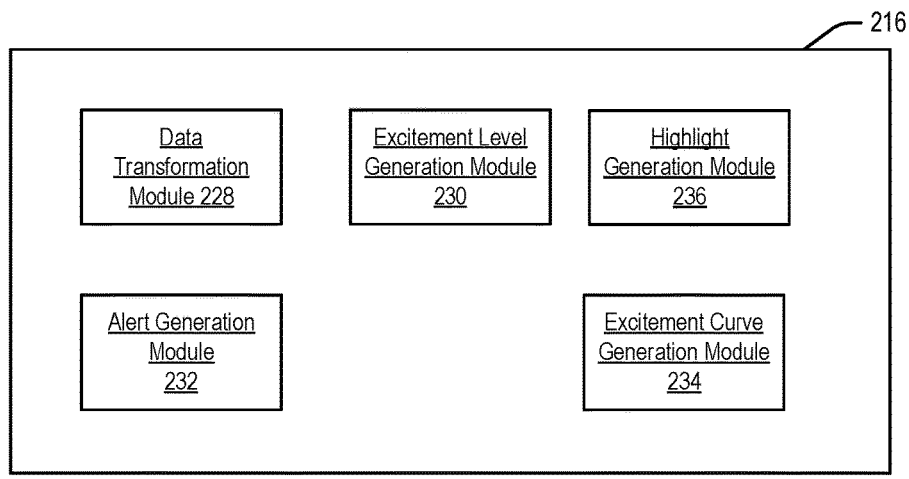
FIG. 3 is a block diagram of one embodiment of software components on a server.

FIG. 3 is a block diagram depicting one embodiment of the software components of the Application server(s) 216 depicted in FIG. 2. In one embodiment, Application Server(s) 216 includes a Data Transformation Module 228, an Excitement Level Generation Module 230, an Alert Generation Module 232, a Excitement Curve Generation Module 234, and a Highlight Generation Module 236. Data Transformation Module 228 receives and analyzes live feeds such as play-by-play statistics related to events from one or more Data Providers 222. Excitement Level Generation Module 230 generates different excitement levels based on the analysis performed by the Data Transformation Module 228. Alert Generation Module 232 generates alerts based on the different sets of excitement levels generated by the Excitement Level Generation Module 230. AN alert can be a message, pop-up, window notification, etc. that appraises a user of an exciting event. Excitement Curve Generation Module 234 generates excitement curves based on the generated excitement levels for an event. Highlight Generation Module 236 identifies segments of the event based on the excitement levels and generates highlight videos based on the identified segments. The operation of Data Transformation Module 228, Excitement Level Generation Module 230, Alert Generation Module 232, Excitement Curve Generation Module 234, and Highlight Generation Module 236 is described below in more detail with respect to FIGS. 5-14.

Figure 4:
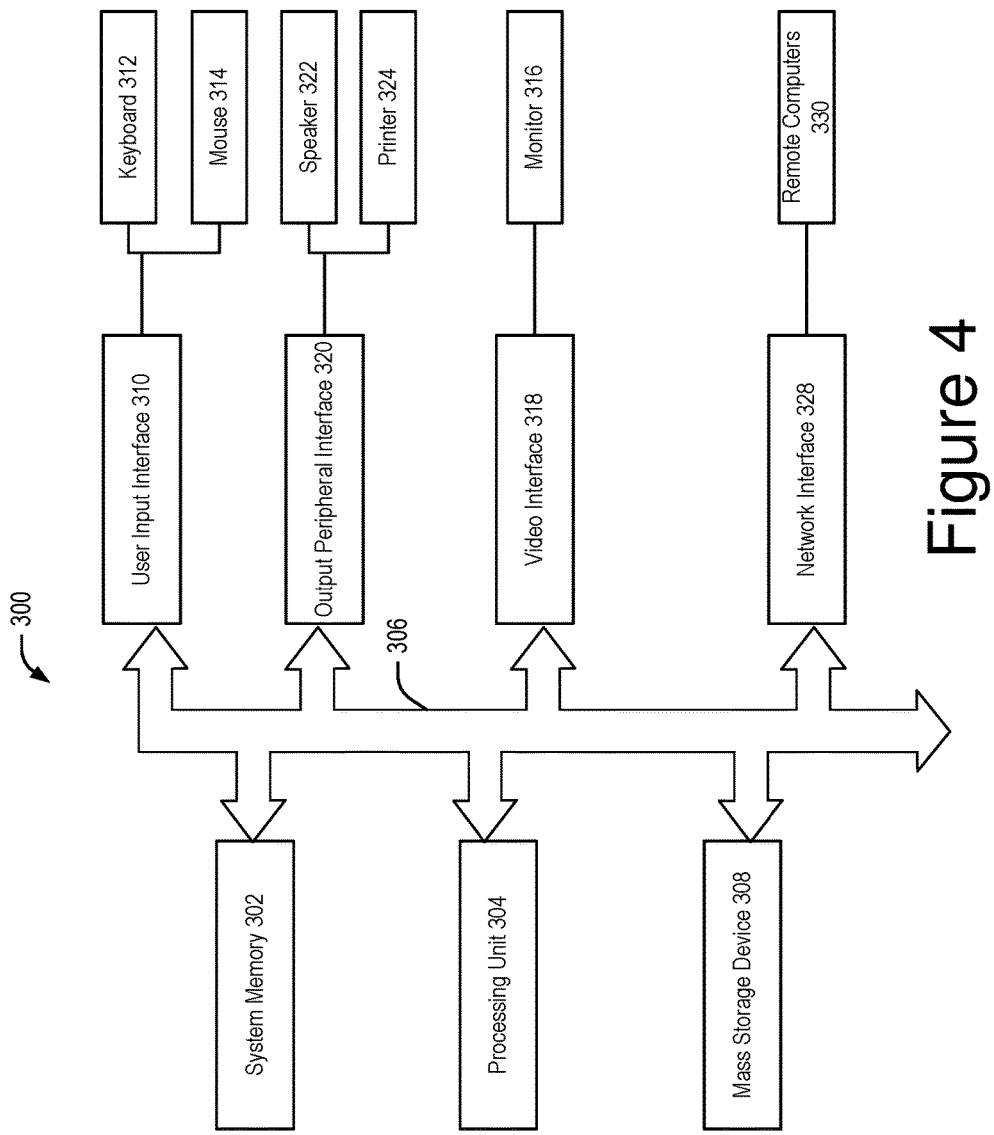
FIG. 4 is a block diagram of one embodiment of computing system.

FIG. 4 illustrates a general purpose computing device which can be used to implement any of the computing devices shown in FIG. 2. For example, the general purpose computing device described in FIG. 4 can be used to implement Application server(s) 216 or any of the client devices 206, 208 and 210. Computing system 300 of FIG. 4 includes a System Memory 302, a Processing Unit (also known as a processor) 304 and a System Bus 306 that couples various system components including the System Memory 302 to the Processing Unit 304. The System Bus 306 may be any of several types of bus structures including a memory bus or memory controller, a peripheral bus, and a local bus using any of a variety of bus architectures.

System Memory 302 stores, in part, instructions and data for execution by Processing Unit 304 in order to perform the process described herein (e.g., see FIGS. 5-14). System Memory 302 includes computer storage media in the form of volatile and/or nonvolatile memory such as read only memory (ROM) and random access memory (RAM). A basic input/output system (BIOS), containing the basic routines that help to transfer information between elements within computer 300, such as during start-up, is typically stored in the ROM. RAM typically contains data and/or program modules that are immediately accessible to and/or presently being operated on by Processing Unit 304.

The system of FIG. 4 further includes a Mass Storage Device 308. Mass Storage Device 308, which may be implemented with a magnetic disk drive, an optical disk drive or flash memory, is a non-volatile storage device for storing data and instructions for use by Processing Unit 304. In one embodiment, Mass Storage Device 308 stores the system software for implementing the processes described herein (e.g., see FIGS. 5-14) for purposes of loading to System Memory 302.

A user may enter commands and information into the computer 300 through input devices such as a Keyboard 312 and Pointing device 314, commonly referred to as a mouse, trackball, touch pad or touch screen. Other input devices (not shown) may include a microphone, joystick, game pad, satellite dish, scanner, or the like. These and other input devices are often connected to the Processing Unit 304 through a User Input Interface 310 that is coupled to the System Bus 306, but may be connected by other interface and bus structures, such as a parallel port, game port or a universal serial bus (USB). A Monitor 316 or other type of display device is also connected to the System Bus 306 via an interface, such as a Video Interface 318. In addition to the monitor, computer system 300 may also include other peripheral output devices such as Speakers 322 and Printer 324, which may be connected through an Output Peripheral Interface 320.

Computer system 300 may operate in a networked environment using logical connections to one or more Remote Computers 330. Remote Computers 330 may be a personal computer, a server, a router, a network PC, a peer device or other common network node, and typically includes many or all of the elements described above relative to the computer 300. When used in a networking environment, the computer 300 is connected to a remote network through a Network Interface or adapter 328.

The components contained in the computer system of FIG. 4 are those typically found in computer systems suitable for use with the technology described herein, and are intended to represent a broad category of such computer components that are well known in the art. Thus, the computer system of FIG. 4 can be a personal computer, mobile computing device, tablet, smart cell phone, appliance, wearable, workstation, server, minicomputer, mainframe computer, or any other computing device. The computer can also include different bus configurations, networked platforms, multi-processor platforms, etc. Various operating systems can be used.

Figure 5:
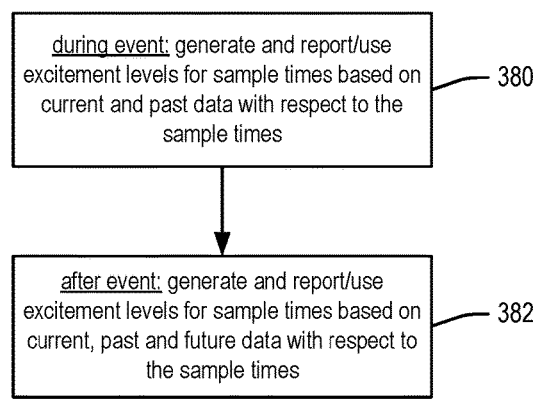
FIG. 5 is a flow chart describing one embodiment of a process for automatically generating excitement levels with improved response times using prospective data.

The devices of FIGS. 2-4 discussed above can be used to implement a system that automatically generating excitement levels with improved response times using prospective data. FIG. 5 is a flow chart describing one embodiment of a process for automatically generating excitement levels for an event with improved response times using prospective data. In one embodiment, the functions of FIG. 5 may be performed by the software modules in the Application Server(s) 216. Step 380 of FIG. 5 is performed during the event. Application Server(s) 216 generates and reports/uses excitement levels for sample times based on current and past data with respect to the sample times. Step 382 is performed Application Server(s) 216 after the event. Application Server 216 generates and reports/uses excitement levels for sample times based on current, past and future data with respect to the sample times. More details of steps 380 and 382 are provided below.

Figure 6:
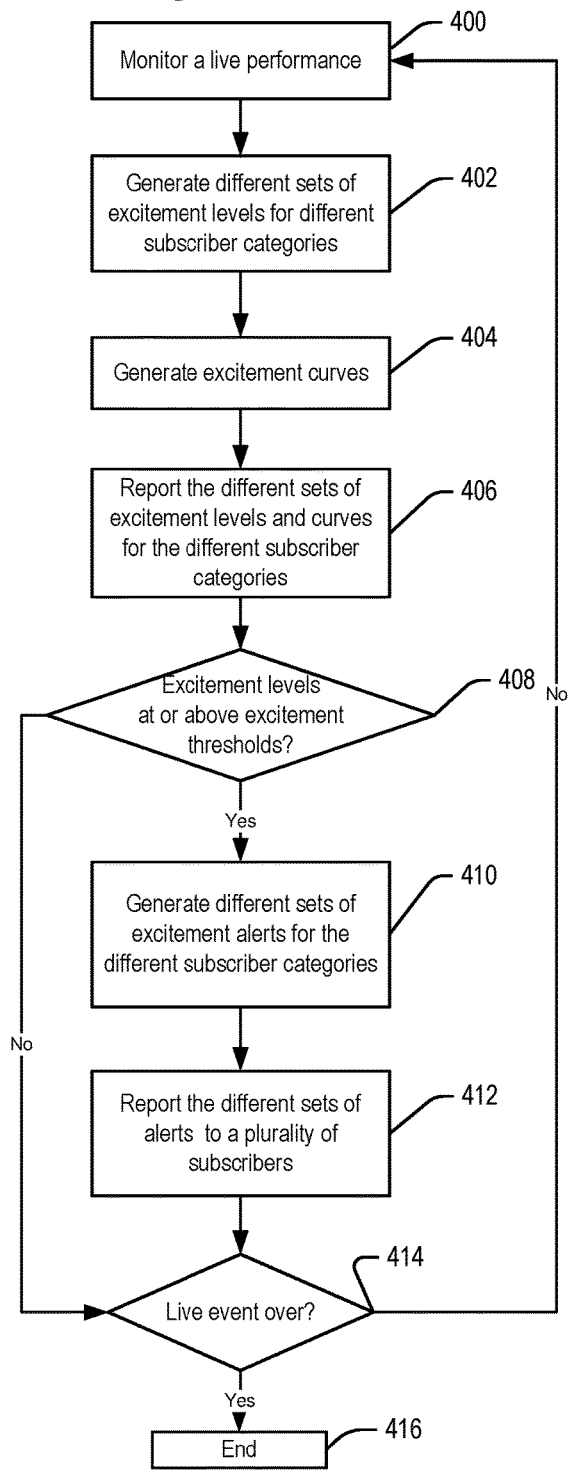
FIG. 6 is a flow chart describing one embodiment of a process for automatically generating excitement levels during a live event.

FIG. 6 is a flow chart describing one embodiment of a process for automatically generating and reporting/using excitement levels during an event based on current and past data with respect to the sample times. Thus, the process of FIG. 6 is an example implementation of step 380 of FIG. 5, performed by Application Server(s) 216 during a live event. In one embodiment, the process of FIG. 4 is performed in real time.

In step 400 of FIG. 6, the event is monitored. The process of monitoring an event is discussed in more detail in FIG. 7. Although the process of FIG. 6 is described with respect to monitoring a single event, it is to be appreciated that the process of FIG. 6 may be performed for multiple performances (in parallel or serially). In step 402, different sets of excitement levels are generated for the event for different categories of subscribers. In one set of examples, the different categories of subscribers include home team fans, visiting team fans and neutral fans. The process by which different sets of excitement levels are generated for the different categories of subscribers is discussed in more detail in FIG. 9. In some embodiments, only one set of excitement levels are generated for the event for all categories of subscribers. In step 404, one or more excitement curves are generated based on the generated excitement levels. In one embodiment, the excitement levels are graphed and connected to form a curve. Some embodiments smooth the curve.

In step 406, the different sets of excitement levels and excitement curves are reported to a plurality of subscribers. For example, the excitement levels and excitement curves are transmitted to the computers 208 and/or mobile devices 210 (which are remote from Application server(s) 216) via the Internet such that computers 208 and/or mobile devices 210 display the excitement levels and excitement curves as per the GUI of FIG. 1.

In step 408, it is determined whether one or more of the excitement levels generated in step 402 are at or above one or more excitement thresholds. In accordance with the disclosed technology, in order to notify subscribers when an event begins to get sufficiently exciting, it is determined if an excitement level is at or above a certain value for a specific amount of time. This value is referred to herein as an excitement threshold. If, in step 408, it is determined that none of the excitement levels generated in step 402 are at or above one or more excitement thresholds and the event has not ended, then the process continues to monitor the event in real-time in step 400 if the live event is not over (step 414).

If there are one or more of the excitement levels that are at or above one or more excitement thresholds for sufficient amount of time (step 408), then in step 410 one or more different sets of alerts are generated for one or more different categories of subscribers. In step 412, the different sets of alerts are reported to the subscribers. In step 414, it is determined if the event has ended. If the event has ended, the process ends in step 416. If the event has not ended, then the process continues to monitor the event in real-time in step 400.

Figure 7:
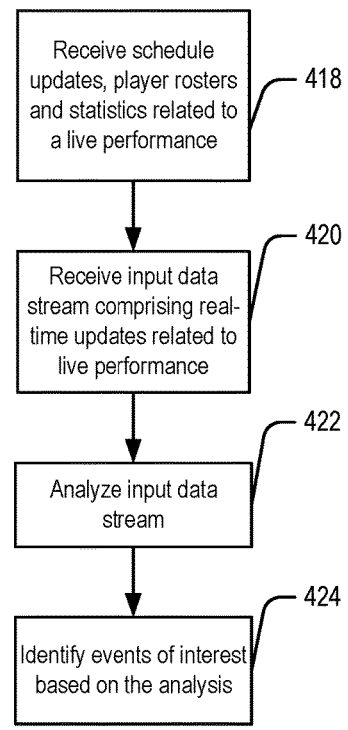
FIG. 7 is a flow chart describing one embodiment of process for monitoring a live event.

FIG. 7 is a flow chart describing a process for monitoring an event in real-time. The process of FIG. 7 is one example of performing step 400 of FIG. 4. In one embodiment, the process of monitoring an event is performed by the Data transformation module 228 in the Application server(s) 216.

In step 418, schedule updates, player rosters and statistics related to an upcoming event are received from one or more Data Providers 222. The data can be received electronically via the Internet or by other means. In step 420, an input data stream comprising real-time data updates (state information) related to the event is accessed or received. In one embodiment, the input data stream comprises files (or other data structures) of play-by-play statistics related to the event that describe what is transpiring at the event. In some embodiments, the input data stream is acquired from Data Providers 222. In other embodiments, the input data stream may be generated manually by subscribers viewing the event or by one or more computers that process the video of the event.

In step 422, the input data stream is analyzed. In one embodiment, analyzing the input data stream includes transforming the information in the input data stream into a common data structure format of play events that describes an individual play or action of the event in a structured way. FIG. 8 is an exemplary illustration of the representation of an input data stream as a common data structure of play events related to the event. In one embodiment, the data structure of play events 428 represents a set of real-time measured data related to the event. FIG. 8 shows the format of one record of data. The system may have many records, perhaps one record per sample time or one record every X seconds. The set of real-time measured data of a record as per the format of FIG. 8 includes, but is not limited to, a game ID, a game clock time, a game score, a play description, an event type ID, a position on the field, type of play, players involved, player statistics, schedule updates and current team scores. Additional context data can also be included. The real-time measured data may also include real-time updates related to the event received from social networking or other communication services such as Twitter® feeds, Facebook® updates or real-time updates received from one or more third party information sources.

In step 424, one or more events of interest in the event are identified, based on the analysis. In one example, identifying an event of interest may include identifying a nail-biter event. As used herein, a nail-biter event refers to a situation or activity during the event wherein the outcome of the situation or activity is so uncertain that it causes the event to become more exciting than usual. For example, in a live sports performance, a nail-biter event is identified as an event in which the score is close, the lead can change at any moment and there is only time left for one more score or a small number of scores. In another embodiment, a nail-biter event can also be identified when or more excitement levels are at or above one or more excitement thresholds. Other events of interest can also be identified, such as baseball game with a potential no-hitter, overtime in soccer, a shutout in American football, etc.

In one embodiment, the input data stream is analyzed over different time-intervals. In one embodiment, a first time-interval is measured from the start of the event to a current point in time during the event. In another embodiment, a second time-interval is measured from a point in time after the start of the event to a current point in time during the event. For example, the input data stream is analyzed for the most recent X minutes. In this manner, the input data stream is analyzed over two time-intervals or time-windows. In other embodiments, more than two time-intervals may also be used.

In one embodiment, the analysis of the input data stream over different time intervals results in the generation of different types of excitement levels related to the event. The generation of excitement levels is discussed in detail in FIG. 9. In one embodiment, analyzing the input data stream over the first time-interval (from the start of the event to a current point in time) results in the generation of different sets of final excitement levels (referred to as final excitement levels) related to the event, and analyzing the input data stream over the second time-interval (from a point in time after the start of the event to a current point in time) results in the generation of different sets of instantaneous excitement levels (referred to as the instant excitement levels) related to the event. The duration of the second time-interval may be pre-determined by the system. The duration of the second time-interval determines how instantaneous the excitement levels related to the event are. In one example, the duration of the second time-interval is one or a few seconds. In one embodiment, the final excitement levels are an average of the instant excitement levels.

In one embodiment, the analysis of the input data stream over the different time-intervals is implemented using a time-window based decay algorithm. The time-window based decay algorithm weights events that occur during the event based on when the events occur, wherein events of interest that occur in the past have a smaller impact on the events of interest occurring in the present. That is, the time-window based decay algorithm is basically a system for reducing the size of the time-interval towards the end of the event. For example, consider an event of interest such as a score update that occurs during the event. In one embodiment, each time a score update is received in real-time, the value of every contributing score update that occurred from the start of the event is re-calculated to determine the different excitement levels for the event. This results in the generation of final excitement levels for the event. In another embodiment, each time a score update is received in real-time, only the new score updates that occur within the pre-defined time-interval are considered, the old score-updates outside the time-interval are pushed out, and the score-updates are re-calculated from those that are within the time-interval to determine the different excitement levels for the event. This results in the generation of instantaneous excitement levels for the event.

FIG. 9 is a flow chart describing one embodiment of a process for generating different sets of excitement levels. The process of FIG. 9 is one example of performing step 402 of FIG. 6. In one embodiment, the process of FIG. 9 is performed by the Excitement Level Generation Module 230 in Application server 216.

In step 430, the system identifies information (for example, in response to the analysis of the input data stream performed in step 422 of FIG. 7) related to one or more performance attributes. In one embodiment, the performance attributes represent specific, gradable and qualified aspects of one or more high-level characteristics of the event that quantitatively impact the excitement of the event. In one embodiment, the performance attributes include a pace attribute, a parity attribute, a novelty attribute, a momentum attribute, a context attribute related to the event and a social buzz attribute.

The pace attribute measures the energy level of the event. For example, for a sport such as cricket, the pace is measured by the number of runs scored per ball or over, or the number of fours and sixes scored within a period of time. For a sport such as American Football, the velocity may be measured by the yards per play.

The parity attribute measures how close two teams are matched throughout the event. The parity attribute also compares how one team scores with respect to the other. For example, the parity attribute may compare the pace across two teams. It is to be appreciated that for an event to be exciting, the parity should ideally be even and the pace should be high.

The novelty attribute measures the uniqueness of individual events that occur both before and during an event. A triple play in baseball, a hat trick in hockey, a comeback, an upset and a last second shot are examples of events that affect the novelty attribute.

The momentum attribute relates to the shift in the event which defines which player or team is doing better with respect to another player or team.

The context attribute defines the existence and extent of any rivalry between teams, importance or prominence of the game (for example, a playoff game vs regular season, or a meeting of two highly ranked teams as opposed to two obscure ones), the impact of a given event on the overall playoff picture, or the importance of a particular game within a playoff series, bracket, or competition. Note that in other embodiments, other attributes can be used instead of or in addition to the above-described attributes.

The social buzz attribute is a measure of activity about the event on social media.

In step 432, a score for each of the performance attributes in the input data stream is computed. In one example, a pace score, a parity score, a novelty score, a momentum score, a context score and a social buzz score are computed. In one embodiment, step 432 includes computing different scores (e.g., three different scores) for each of the performance attributes for the different subscriber categories. For example, velocity attribute scores for the home team fan, the visiting team fan and the neutral fan are computed; parity attribute scores for the home team fan, the visiting team fan and the neutral fan are computed; novelty attribute scores for the home team fan, the visiting team fan and the neutral fan are computed; momentum attribute scores for the home team fan, the visiting team fan and the neutral fan are computed; context attribute scores for the home team fan, the visiting team fan and the neutral fan are computed; and social buzz attribute scores for the home team fan, the visiting team fan and the neutral fan are computed. In such an embodiment, eighteen attribute scores are calculated six for the home team fan, six for the visiting team fan and six for the neutral fan. In other embodiments, only one set of scores are calculated.

It is to be appreciated that computing different scores for a particular performance attribute results in the generation of different sets of excitement levels for the event for the different subscriber categories. In one embodiment, computing different scores for a particular performance attribute comprises increasing or decreasing the value of the attribute based on how the value of the attribute affects the excitement of the event for the different subscriber categories. For example, in cricket, one way by which the pace attribute is measured is based on the number of runs scored per over. In one example, the value of the pace score may be increased by a certain factor to determine a pace score for the home team, while the value of the pace score may be decreased by a certain factor to determine a pace score for the visiting team.

In step 434, generic attribute weights are applied to each of the performance attributes for the different subscriber categories. In one example, the generic attribute weights are computed based on the time elapsed in the event. For example, the generic attribute weight applied to a pace attribute at the start of the event is higher as compared to the generic attribute weight applied to the parity attribute at the start of the event.

In step 436, a mathematical function (e.g., sum, weighted sum, average, weighted average, or other mathematical function) of the scores and the generic attribute weights applied to each of the performance attributes is computed to generate the different sets of excitement levels for the event, for the different subscriber categories. In one embodiment, step 436 includes generating three excitement levels: one for the home team fan based on the attributes calculated for the home team fan, one for the visiting team fan based on the attributes calculated for the visiting team fan, and one for the neutral fan based on the attributes calculated for the neutral fan.

In one embodiment, step 436 includes generating three instant excitement levels (home, visiting and neutral) and three final excitement levels ((home, visiting and neutral). In one embodiment, only final excitement levels are generated. In another embodiment, only instant excitement levels are generated.

In other examples, additional excitement levels may be generated, such as for a fan who does not like one of the teams, a fan who likes low scoring games, a fan who likes a team that is a rival to one of the teams, a fan who likes any close game, etc. For example, an excitement level for a fan who likes low scoring games, for a game such as cricket may be determined by increasing or decreasing the velocity score based on the number of runs scored per over during the event.

FIG. 10A provides a mathematical equation implemented during the process of FIG. 9 Excitement Level Generation Module 230 in Application server 216 that indicates that an excitement level EL(i) for a particular time sample i is the sum of the score for the pace attribute based on past and present data [0→i], the score for the parity attribute based on past and present data [0→i], the score for the novelty attribute based on present data [i], the score for the momentum attribute based on past and present data [0→], the score for the context attribute based on past data [0] known prior to the event, and the score for the social buzz attribute based on present data [i].

Additional details relating to computing excitement levels for an event is set forth in U.S. Pat. No. 8,535,131 and U.S. Pat. No. 9,060,210, both of which are incorporated by reference in their entirety.

FIG. 11 is a flow chart describing one embodiment of a process for automatically generating excitement levels with improved response times using prospective data. The process of FIG. 11 is one example implementation of step 382 of FIG. 5, and is performed by Excitement Level Generation Module 230 in Application server(s) 216. In step 600, the system accesses data that provides state information for an event at different times during the event. Step 600 of FIG. 11 in analogous to step 400 of FIG. 6 and the process of FIG. 7 is one example implementation of step 600 of FIG. 11. The state information can be, for example, any or all of the data depicted in data structure 428 of FIG. 8. In one example embodiment, there will be one set of data (one sample) for each sample time during an event.

In step 602 of FIG. 11, the system automatically generates a plurality of excitement levels based on the accessed data of step 600. Each of the excitement levels of the plurality of excitement levels corresponds to a different sample time during the event. For each sample time, the generating of the plurality of excitement levels comprises calculating an excitement level based on accessed data prior in time to the sample time, accessed data for the sample time and accessed data subsequent in time to the sample time. In one embodiment, the process of FIG. 9 is used to implement step 602, relying on data that is previous in time, current in time and subsequent in time. When using the process of FIG. 9 to implement step 602, the process of FIG. 9 is performed based on the equation of FIG. 10B, which indicates that an Excitement Level(i) for a particular time sample (i) is the sum of the score for the pace attribute based on past, present and future data [0→i, i→N], score for the parity attribute based on past, present and future data [0→i, i→N], the score for the novelty attribute based on present data [i], the score for the momentum attribute based on past, present and future data [0→i, i→N], the score for the context attribute based on past data [0] known prior to the event, and the score for the social buzz attribute based on present data [i]. Thus, a first subset of the performance attributes (e.g., novelty and social buzz) are based on current data but not data subsequent in time and a second subset of the performance attributes (e.g. pace, parity and momentum) are based on data prior in time and, current data and data subsequent in time. Therefore, when performing the process of FIG. 9 as part of step 380 of FIG. 5, equation FIG. 10A is used and when performing the process of FIG. 9 as part of step 382 of FIG. 5, the equation of FIG. 10B is used.

In step 604 of FIG. 11, the system reports the generated excitement levels. In one embodiment, the numbers representing the excitement levels are reported to subscribers. In other embodiments, the excitement levels are reported by reporting the excitement curves (which create a curve from the excitement levels).

In step 606, the system automatically generates one or more excitement curves based on the excitement levels. In step 608, the system reports the generated excitement curves to the subscribers. In step 610, the system identifies the exciting segments in the event based on excitement levels, the access data and/or the excitement curves. For example, looking back at FIG. 1, segments 20, 22, 24, 26, 28 and 32 can be identified in step 610. In step 612, the system creates a highlight video from the identified segments. In one embodiment, the identified segments are extracted from the video of the event and aggregated into a highlight video. In step 614, the system calculates a time to start watching the event. For example, the system will calculate the WFH marker depicted in FIG. 1 to indicate that the user should start watching from that location. In one embodiment, the time to start watching is calculated based on where one or more particularly novel plays happen, where the excitement level increases dramatically, and/or where the excitement curve starts trending in an upward direction. Other algorithms can be used for determining a time to start watching. In step 616, the system reports the time to start watching. In one embodiment, all the reporting steps in FIG. 11 are implemented by sending information from the Application server(s) 216 to any one or more of the subscriber devices (e.g. computer 208, mobile device 210) that can be used to implement the GUI of FIG. 1.

Figure 12:
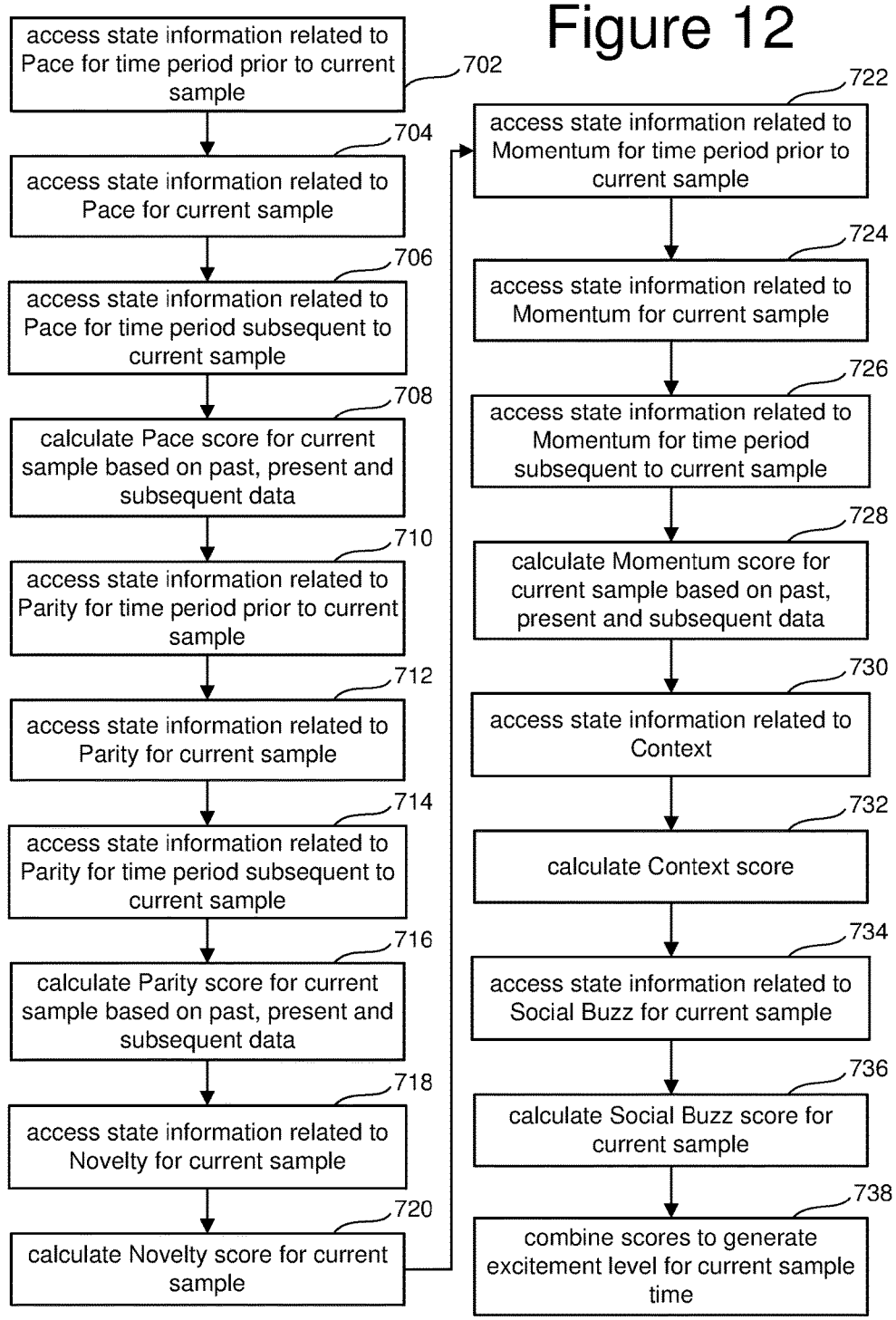
FIG. 12 is a flow chart describing one embodiment of process for automatically generating excitement levels.

FIG. 12 is a flowchart describing one embodiment of a process for automatically generating excitement levels. The process of FIG. 12 is an example implementation of step 602 of FIG. 11 and provides example details of performing the process of FIG. 9 based on the equation of FIG. 10B. In one embodiment, the process of FIG. 12 is performed by the Excitement Level Generation Module 230 in Application server(s) 216. In one embodiment, the process of FIG. 12 is performed once for each sample time.

In step 702 of FIG. 12, the system accesses state information related to pace for the time period prior to the current sample time. Note that the state information is the data portrayed in FIG. 8. In step 704, the system accesses state information related to pace for the current sample time. In step 706, the system accesses state information related to pace for the time period subsequent to the current sample time. In step 708, the system calculate a score for pace for the current sample based on past, present and subsequent data.

In step 710, the system accesses state information related to parity for the time period prior to the current sample time. In step 712, the system accesses state information related to the parity for the current sample time. In step 714, the system accesses state information related for parity for the time period subsequent to the current sample time. For example, if the current sample time is three-quarters of the way into the game, then step 714 will include accessing state information (the data of FIG. 8) for time period in the last quarter of the game. In step 716, the system calculates the score for parity for the current sample based on past, present and subsequent data.

In step 718, the system accesses state information related to novelty for the current sample. In step 720, the system calculates a score for novelty based on the current sample, and not on past or subsequent data.

In step 722, the system accesses state information related to momentum for the time period prior to the current sample. In step 724, the system accesses state information related to momentum for the current sample time. In step 726, the system accesses state information related to momentum for the time period subsequent to the current sample time. In step 728, the system calculates a score for momentum for the current sample based on past, present and subsequent data.

In step 730, the system accesses state information related to context. In one embodiment, the information for context would be available prior to the game, or at the beginning of the game. In step 732, the system calculates a score for context based on the past data accessed in step 730.

In step 734, the system accesses state information related to social buzz for the current sample time i. Step 736, the system calculates social buzz score for the current sample time. The process of FIG. 12 is performed every sample time. The results of one iteration of the process of FIG. 12 are six scores which are then combined to create an excitement level for the current sample time in step 738.

Figure 13:
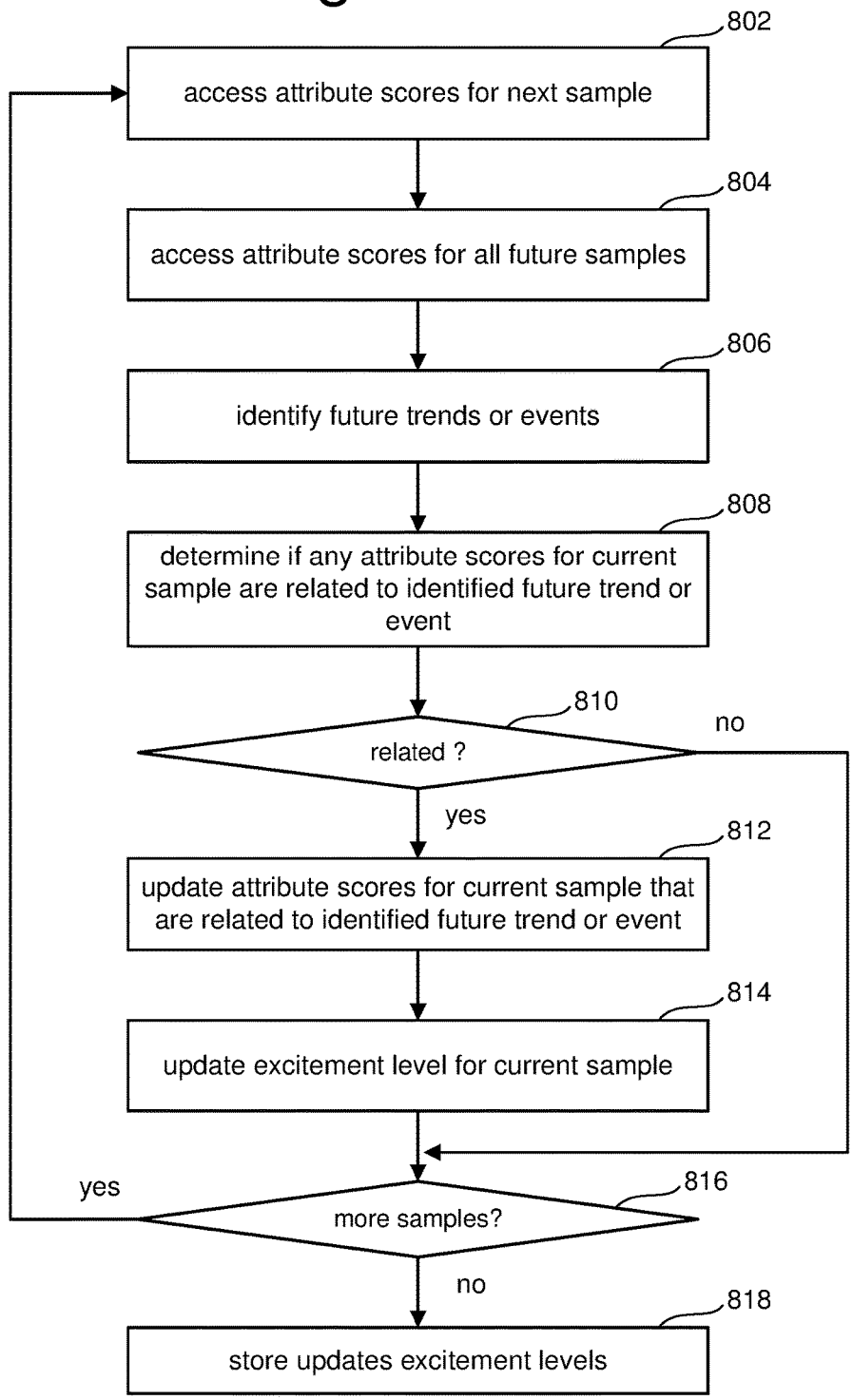
FIG. 13 is a flow chart describing one embodiment of process for automatically generating excitement levels.

FIG. 13 is a flow chart describing another embodiment of a process automatically generating excitement levels. The process of FIG. 13 is another example of implementation of step 602 of FIG. 11. In one embodiment, the process of FIG. 13 is performed by the Excitement Level Generation Module 230 in Application server(s) 216. The process of FIG. 13 assumes that the process of FIG. 9 was already performed for every sample time during the event as part of step 380 to create excitement levels based on past and present data in real time during the live event. Thus, the process of FIG. 13 is used to adjust those excitement levels based on subsequent (future) data. The process of FIG. 13 includes a loop (steps 802-816) that operates on each of the sample times of the previously created set of excitement levels.

Thus, when performing the process of FIG. 9 as part of step 380 of FIG. 5, equation FIG. 10a is used and when performing the process of FIG. 9 as part of step 382 of FIG. 5, the equation of FIG. 10b is used.

In step 802 of FIG. 13, the system accesses attribute scores for the next sample. If this is first time the loop of steps 802-816 is being performed, then the first sample time is accessed in step 802. In step 804, the system accesses the attribute scores for all future sample times. In step 806, the system attempts to identify any trends or events in the future sample times. In step 808, the system determines if any of the attribute scores for the current sample time are related to the identified future trends or events from step 806. If they are related, then in step 812 the attribute scores for the current sample that are related to an identified future trend or event are updated based on the identified future trend or event. The updating the attribute scores automatically causes an update in the excitement level for current sample in step 814. In step 816, the system determines whether there are any more samples to operate on. If so, the process loops back to step 802. If there are no more samples to operate on, then the system stores the updated excitement levels to step 818. Note that in step 810, if none of the attribute scores for the current sample are related to an identified future trend or event, then steps 812 and 814 are skipped and the process proceeds directly to step 816.

Figure 14:
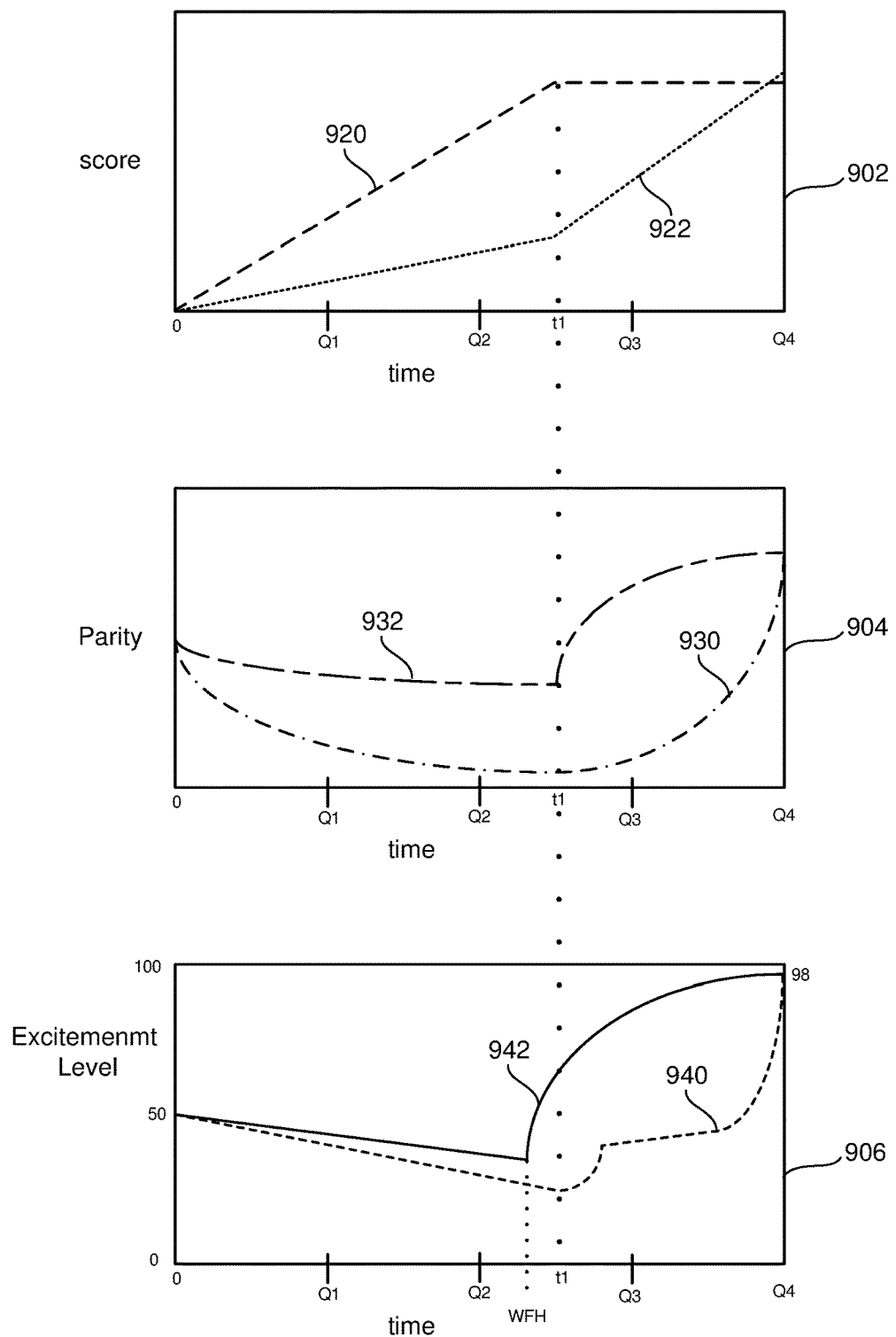
FIG. 14 includes three graphs depicting information over a common time period for scoring during a sporting event, a Parity attribute and excitement curves.

FIG. 14 includes three graphs depicting information over a common time period, and is provided to explain an example use of the technology described herein. FIG. 14 assumes a sporting event between two teams, Team A and Team B, where the sporting event has four quarters. Other types of events can also be used. The top graph of FIG. 14, graph 902, depicts score versus time. Line 920 depicts a representation of the score for Team A. Line 922 depicts a representation of the score for Team B. As can be seen, Team A takes an early lead in the game. However, at time t1, Team B begins a comeback which culminates in Team B overtaking Team A at the very end of the game (right before the end of the fourth quarter) such that Team B wins. Graph 902 is an example of a subset of state information for several time samples.

Graph 904 depicts scores for the parity attribute versus time. Note that the time axis for graph 904 is exactly the same as the time axis for graph 902. Graph 904 shows two curves: curve 930 and curve 932. Curve 930 shows parity scores generated during performance of step 380 (see FIG. 5), which includes using past and current data only. Curve 932 is parity scores generated during step 382 (see FIG. 5), which includes past, present and future data. Thus, curve 932 can be generated, for example, during the process of FIG. 12 or the process of FIG. 13. Both curves 930 and 932 are generated based on Graph 902. As Team A starts to get a bigger lead, the magnitude of the parity score decrease. As Team B makes its comeback to win the game, the parity scores will increase. Graph 902 shows that the comeback starts at time t1. However, curve 930 is slow to react to the start of the comeback at time t1 because the scores of the two teams are still far apart. However, when generating the parity scores for curve 932 using subsequent (prospective) data, the system knows that the comeback was successful; therefore, the parity scores of curve 932 will increase much faster than the parity scores of curve 930. Thus, the parity function will experience an improved response time using the prospective data. Additionally, because the system has access to prospective data, prior to time t1 the parity scores of curve 932 will not decease as deeply as the parity scores of curve 930.

Graph 906 depicts excitement level versus time. Note that the time axis for graph 907 is exactly the same as the time axis for graph 902. Curve 940 is an excitement level prepared based on the equation of FIG. 10A that uses past and present data. For example, curve 940 may have been generated during step 380 of FIG. 5. Curve 942 is an excitement level prepared based on the equation of FIG. 10B that uses past, present data and future. For example, curve 942 may have been generated during step 382 of FIG. 5. Excitement curves 940 is at least partially based on curve 930 and excitement curve 942 is at least partially based on curve 932. Excitement curve 940 shows that the excitement levels are decreasing from the start of the game up until time t1, and then the excitement curve starts to increase. However, excitement curve 940 does not increase dramatically until the very end of the game. On the other hand, excitement curve 942 and its accompanying excitement levels dramatically increase starting at time t1 because the system has the benefit of knowing the subsequent data which indicates that Team B makes a successful comeback. Therefore the game becomes very exciting at time t1. In fact, knowing that the comeback was successful, the game becomes exciting just before time t1 as a user/subscriber would want to tune into the game (see WFH) just prior to the start of the comeback. Because excitement curve 942 increases earlier and faster than excitement curve 940 due to the comeback of Team B, excitement curve 942 has an improved response time using the prospective data, as compared to excitement curve 940. Similarly, the excitement levels generated that are used to build excitement curve 942 have an improved response time using the prospective data, as compared to the excitement levels generated and used for excitement curve 940.

One embodiment includes accessing data that provides state information for an event at different times during the event, automatically generating a plurality of excitement levels based on the accessed data, and reporting the generated excitement levels. Each of the excitement levels of the plurality of excitement levels corresponds to a different sample time during the event. For each sample time, the generating of the plurality of excitement levels comprises calculating an excitement level based on accessed data prior in time to the sample time and accessed data subsequent in time to the sample time.

One embodiment includes an apparatus, comprising: a data storage system configured to store data that provides state information for an event at different times during the event; and one or more processors in communication with the data storage system, for each sample time of a set of sample times during the event the one or more processors are configured to automatically generate a sample time excitement level for the event based on accessed data prior in time to the sample time and accessed data subsequent in time to the sample time.

One embodiment includes one or more processor readable storage devices storing processor readable code thereon, the processor readable code for programming one or more processors to perform a method comprising: accessing data that provides state information for an event at different times during the event; generating a plurality of excitement levels based on the accessed data, each of the excitement levels of the plurality of excitement levels corresponds to a different sample time during the event, for each sample time the generating the plurality of excitement levels comprises determining an excitement level based on accessed data prior in time to the sample time and accessed data subsequent in time to the sample time; and reporting the generated excitement levels.

One embodiment includes an apparatus, comprising: a data storage system and one or more processors in communication with the data storage system. The data storage system is configured to store data that includes a plurality of records. Each record of the plurality provides state information for an event at a different time during the event. The one or more processors are configured to receive a stream of input data comprising information about occurrences in the event and transform the stream of input data to the plurality of records. For each sample time of a set of sample times during the event the one or more processors are configured to generate attribute scores for the sample time for a set of performance attributes based on records from the set of data prior in time and records from the set of data later in time. For each sample time of the set of sample times during the event the one or more processors are configured to generate a composite score as a function of the generated attribute scores for the sample time. The one or more processors are configured to report the generated sample time excitement levels to a remote computing device.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the claims to the precise form disclosed. Many modifications and variations are possible in light of the above teaching. The described embodiments were chosen in order to best explain the principles of the technology disclosed herein and its practical application, to thereby enable others skilled in the art to best utilize the technology in various embodiments and with various modifications as are suited to the particular use contemplated. It is intended that the scope be defined by the claims appended hereto.

What is claimed is:

1. A method, comprising:
accessing data that provides state information for an event at different times during the event;
automatically generating a plurality of excitement levels based on the accessed data, each of the excitement levels of the plurality of excitement levels corresponds to a different sample time during the event, for each sample time the automatic generating of a respective one of the plurality of excitement levels comprises calculating an excitement level based on accessed data prior in time to the sample time and on accessed data subsequent in time to the sample time; and
reporting the generated excitement levels.

2. The method of claim 1, wherein:
the generating the plurality of excitement levels is performed on a server; and
the reporting the generated excitement levels includes transmitting the excitement levels to a remote computing system.

3. The method of claim 1, wherein:
the generating the plurality of excitement levels is performed on a server; and
the reporting the generated excitement levels includes transmitting the excitement levels to a plurality of subscriber computing systems via a network.

4. The method of claim 1, further comprising:
generating an excitement curve from the generated excitement levels and transmitting the excitement curve to a remote computing system.

5. The method of claim 1, further comprising:
generating an excitement curve from the generated excitement levels and displaying the excitement curve.

6. The method of claim 1, wherein the generating the plurality of excitement levels comprises:
determining information for performance attributes for the data;
computing different scores for each of the performance attributes; and
generating the excitement levels as a function of the scores for the performance attributes for a common sample time.

7. The method of claim 6, wherein:
a first subset of the performance attributes are based on current data but not data subsequent in time; and
a second subset of the performance attributes are based on data prior in time, current data and data subsequent in time.

8. The method of claim 7, wherein:
the first subset of the performance attributes includes novelty and context; and
the second subset of performance attributes includes pace, parity and momentum.

9. The method of claim 1, further comprising:
automatically generating a first set of excitement levels based on the accessed data, for each sample time the generating of the first set of excitement levels comprises automated determining of an excitement level based on accessed data prior in time to the sample time and not based on accessed data subsequent in time to the sample time, wherein the generating of the first set of excitement levels is performed during the event, and
wherein the generating of the plurality of excitement levels is performed after the event, where for a particular sample time a corresponding excitement level from the first set of excitement levels is different than a corresponding excitement level from the plurality of excitement levels.

10. An apparatus, comprising:
a data storage system configured to store data that provides state information for an event at different times during the event; and
one or more processors in communication with the data storage system and configured such that, for each sample time of a set of sample times during the event the one or more processors automatically generate a sample time excitement level for the event based on accessed data available prior in time to the sample time and based on accessed data available only subsequent in time to the sample time.

11. An apparatus according to claim 10, wherein:
the one or more processors are configured to transmit the generated sample time excitement levels to a remote computing device.

12. An apparatus according to claim 10, wherein:
the one or more processors are configured to transmit the generated sample time excitement levels to a plurality of subscriber computing systems via a network.

13. An apparatus according to claim 10, wherein:
the one or more processors are configured to generate an excitement curve from the generated excitement levels and transmitting the excitement curve to a remote computing system.

14. An apparatus according to claim 10, wherein:
the one or more processors are configured to generate an excitement curve from the generated excitement levels and display the excitement curve.

15. An apparatus according to claim 10, wherein:
the one or more processors are configured to generate and report a time to start watching within the event based on the automatically determined excitement levels.

16. An apparatus according to claim 10, wherein:
the one or more processors are configured to identify segments of the event based on the excitement levels and generate a highlight video based on the segments.

17. An apparatus according to claim 10, wherein:
wherein the one or more processors are configured to generate the plurality of excitement levels by determining information for performance attributes for the data, computing different scores for each of the performance attributes and calculating the excitement levels as a function of the scores for the performance attributes for a common sample time.

18. An apparatus according to claim 17, wherein:
a first subset of the performance attributes are based on current data available for each respective sample time but not data that is available only subsequent to the respective sample time; and
a second subset of the performance attributes are based on data available for each respective sample time prior in time to the respective sample time, current with the respective sample time and available only subsequent to the respective sample time.

19. An apparatus according to claim 10, wherein:
the one or more processors are configured to automatically generate the sample time excitement levels for respective sample times of the event after the event based on accessed data available prior in time to the sample time and based on accessed data available only subsequent in time to the sample time; and
during the event, the one or more processors are configured to automatically generate other sample time excitement levels without using data available only subsequent in time to the respective sample times.

20. An apparatus according to claim 10, wherein:
the one or more processors are configured to automatically generate a sample time excitement level by accessing state information for an attribute for a time period prior to the sample time, accessing state information for the attribute for a time period at the sample time, accessing state information for the attribute for a time period subsequent to the sample time, and calculating a score for the attribute based on the accessed attribute state information of said time periods prior to the sample time, at the sample time and subsequent to the sample time.

21. An apparatus according to claim 10, wherein:
the one or more processors are configured to automatically generate a sample time excitement level by accessing attribute scores for the sample, accessing attribute scores for a plurality of future samples, identifying future trends or events and determining of any attribute scores are related to an identified future trend or event;
the one or more processors are configured to update attribute scores that are related to an identified future trend or event; and
the one or more processors are configured to update an excitement level based on an updated attribute score.

22. One or more processor readable storage devices storing processor readable code thereon, the processor readable code for programming one or more processors to perform a method comprising:
accessing data that provides state information for an event at different times during the event;
generating a plurality of excitement levels based on the accessed data, where each of the excitement levels of the generated plurality of excitement levels corresponds to a different sample time during the event, where for each sample time the respective generating of the corresponding excitement level comprises determining an excitement level based on accessed data available prior in time to the sample time and accessed data available only subsequent in time to the sample time; and
reporting the generated excitement levels.

23. The one or more processor readable storage devices according to claim 22, wherein the method further comprises:
generating an excitement curve from the generated excitement levels.

24. The one or more processor readable storage devices according to claim 22, wherein the generating the plurality of excitement levels comprises:
determining information for performance attributes for the data;
computing different scores for each of the performance attributes; and
generating the excitement levels as a function of the scores for the performance attributes for a common sample time.

25. The one or more processor readable storage devices according to claim 24, wherein:
a first subset of the performance attributes are based on data prior in time but not data subsequent in time; and
a second subset of the performance attributes are based on data prior in time and data subsequent in time.

26. An apparatus, comprising:
a data storage system configured to store data that includes a plurality of records, each record of the plurality providing state information for an event, the provided state information indicating states of the event at different times during the event; and
one or more processors in communication with the data storage system, the one or more processors being configured to receive a stream of input data comprising information about occurrences within the event and to transform the received stream of input data to the plurality of records,
at least one of the processors being configured such that, for each sample time of a set of sample times during the event, the at least one processor generates attribute scores for the sample time for a set of performance attributes based on records from the set of data available prior in time and records from the set of data available only later in time relative to the sample time and, for each sample time of the set of sample times during the event the at least one processor generates a composite score as a function of the generated attribute scores for the sample time,
where at least one of the one or more processors is configured to report the generated sample time excitement levels to a remote computing device.

* * * * *